US006761821B2

(12) United States Patent
Appel et al.

(10) Patent No.: US 6,761,821 B2
(45) Date of Patent: Jul. 13, 2004

(54) CLAMPING-HOOK RING

(75) Inventors: Michael Appel, Mahtomedi, MN (US); Ross van Someren, Chermside (AU); Richard Kalar, Shoreview, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/205,008

(22) Filed: Sep. 23, 2002

(65) Prior Publication Data

US 2004/0055947 A1 Mar. 25, 2004

(51) Int. Cl.[7] .......................... B01D 33/11; B04B 7/16; B04B 15/00; C13F 1/06

(52) U.S. Cl. .............. 210/232; 210/380.1; 210/497.01; 127/19

(58) Field of Search ............................. 210/232, 360.1, 210/380.1, 497.01; 127/19

(56) References Cited

U.S. PATENT DOCUMENTS

| | | | | |
|---|---|---|---|---|
| 635,770 A | | 10/1899 | Graner | |
| 3,955,754 A | | 5/1976 | Schaper | 233/2 |
| 3,993,243 A | | 11/1976 | Dietzel et al. | 233/2 |
| 4,063,959 A | | 12/1977 | Dietzel et al. | 127/19 |
| 4,072,266 A | | 2/1978 | Dietzel | 233/2 |
| 4,133,770 A | | 1/1979 | Mercier | 210/497 FB |
| 4,157,966 A | | 6/1979 | Hassall | 210/380 R |
| 4,158,573 A | | 6/1979 | Hentschel et al. | 127/19 |
| 4,259,136 A | | 3/1981 | Spiewok | 156/293 |
| 4,308,075 A | | 12/1981 | Hentschel et al. | 127/19 |
| 4,313,992 A | | 2/1982 | Spiewok | 428/136 |
| 4,343,700 A | * | 8/1982 | Daubman et al. | 210/232 |
| 4,352,451 A | | 10/1982 | Journet | 233/27 |
| 4,451,371 A | * | 5/1984 | Peck | 210/325 |
| 4,922,625 A | | 5/1990 | Farmer | 34/58 |
| 5,330,637 A | * | 7/1994 | Nemedi | 210/232 |
| 5,618,352 A | | 4/1997 | Ebeling et al. | 127/19 |
| 5,720,880 A | | 2/1998 | Milner et al. | 210/377 |
| 5,851,169 A | * | 12/1998 | Meresz et al. | 494/12 |

FOREIGN PATENT DOCUMENTS

EP 0031111 * 7/1981

OTHER PUBLICATIONS

U.S. Filter Johnson Screeens, Bulletin dated Apr. 1998.

* cited by examiner

*Primary Examiner*—Fred G. Prince
(74) *Attorney, Agent, or Firm*—Moser, Patterson & Sheridan, L.L.P.

(57) ABSTRACT

A centrifuge screen clamp comprises a body and a screen retaining portion connected to the body. The screen retaining portion comprises a pressure fitting surface and a clamp interface member engaging surface. In one embodiment, the pressure fitting surface is a substantially planar surface disposable on a screen portion of a centrifuge screen and the clamp interface member engaging surface is disposable on a clamp interface member disposed on the screen. The clamp interface member engaging surface operates to apply a counteractive force against the clamp interface member, which counteractive force is substantially coplanar with an inertial sliding tendency direction of the screen during rotation.

35 Claims, 8 Drawing Sheets

CLAMPING-HOOK RING

CROSS-REFERENCE TO RELATED APPLICATIONS

This application is related to co-pending U.S. patent application Ser. No. 09/978,840, which was filed on Oct. 16, 2001, which claims benefit priority under 35 U.S.C. §119 to provisional patent application No. 60/240,784 filed on Oct. 16, 2000 and are both herein incorporated by reference in their entirety.

BACKGROUND OF THE INVENTION

1. Field of the Invention

This present invention relates to filtering devices and clamps. More particularly, the invention relates to centrifuges which utilize a screen to separate a solid from a liquid and for clamps to secure the centrifuges.

2. Description of the Related Art

A conventional sugar refining process employs a centrifuge to separate sugar crystals out of raw molasses. The centrifuge includes a spinning drum having a truncated conical basket, which tapers towards its bottom. The walls of the truncated conical basket are lined with a screen material. In a typical sugar refining process, a raw molasses product containing sugar crystals is poured into the center of a centrifuge spinning at a very high rate—e.g. 1750 rpm. As the raw product containing sugar crystals is poured into the center of the centrifuge, inertia pushes the raw molasses through the screen material, through the basket, and out of the centrifuge. However, the sugar crystals are too big to pass through the screen and are left behind. As the raw molasses pass through the screen, the spinning of the centrifuge forces the sugar crystals up the walls of the centrifuge. The sugar crystals work their way up the screen, eventually passing up and over the perimeter of the screen. In this way, sugar crystals are filtered out of liquid raw molasses product and are collected as they pass over the lip of the spinning screen.

To separate sugar crystals from raw product, the screen employed must be very fine. That is, the openings in the screen must be very small to prevent the sugar crystals from passing through the screen along with the liquid, raw molasses. Conventional sugar processing screens have been formed by "etching" a very thin metal plate. A metal plate may be etched with openings sized small enough to separate sugar crystals from liquid molasses. For example, a metal plate may be etched with a laser to form very small slits in the plate. The plate is then formed into a conical shape which fits within the walls of a centrifuge basket.

The greater the number of slits cut into a conventional sugar processing screen, the greater the "open area" of the screen. A large number of slits, spaced closely together, produces a relatively large "open area" in the screen, which increases the screen's production. However, the slits in a typical sugar processing screen weaken the overall screen and subject it to fatigue. Additionally, sugar crystals may lodge in the slits of a conventional sugar processing screen, thereby reducing its performance. A sugar processing device having a screen which is durable and has a fine opening, high open area would be welcomed by those in the sugar processing industry. Additionally, other industries that utilize such processes as coal dewatering and driller mud dewatering, etc. would welcome a fine opening, high open area centrifuge screen.

Typically, the conventional sugar processing screen is secured in the truncated conical basket by a clamping ring.

A conventional centrifuge 200 is shown in FIG. 12. In particular, FIG. 12 shows a partial cross sectional perspective view of a sugar processing screen 202, a conical basket 204 and a clamping ring 206. The clamping ring 206 is constructed to clamp a lower portion 208 of the conventional sugar processing screen 202 to the truncated conical basket 200 while an upper portion 210 of the conventional sugar processing screen may move freely. In this arrangement, the frictional force created by the clamping ring holds the conventional sugar processing screen in place in the centrifuge. However, a problem associated with the sugar refining process occurs while the centrifuge is spinning at a very high rate of speed. Specifically, the forces created by the centrifuge overcome the clamping force of the clamping ring. At this point, the conventional sugar processing screen begins to slide out of the clamping ring and subsequently flings out of the truncated conical basket, which may cause damage to the equipment or injury to nearby personnel.

There is a need, therefore, for an improved clamping ring arrangement that will secure a screen in conical basket. There is a further need for a clamping ring arrangement that will prevent the screen from falling out while the centrifuge is spinning at a very high rate of speed. There is yet a further need for a more reliable centrifuge screen.

SUMMARY OF THE INVENTION

According to the present invention, a centrifuge screen clamp is provided.

One embodiment provides a centrifuge screen clamp. The clamp comprises a body adapted to be secured to a centrifuge and a screen retaining portion connected to the body. The screen retaining portion comprises a pressure-generating-centrifuge-screen engaging surface adapted to engage a centrifuge screen and apply a force thereto to create a pressure fit; and an interface member engaging surface adapted to engage a corresponding interface portion disposed on the centrifuge screen and create an interference fit therewith, whereby the clamp interface member engaging surface and the clamp engaging surface create equal and opposite forces coplanar with a sliding tendency direction of the screen during rotation.

Another embodiment provides a centrifugal refining device. The centrifugal refining device comprises a rotatable support basket, a screen disposed in the basket for filtering a liquid during rotation of the drum, a clamp interface member rigidly disposed on the screen and defining a clamp engaging surface, and a clamp to secure the screen with respect to the rotatable support basket. The clamp comprises a body and a screen retaining portion connected to the body. The screen retaining portion comprises a pressure-generating-centrifuge-screen engaging surface disposed against the screen and applying a force thereto to create a pressure fit; and a clamp interface member engaging surface disposed against the clamp engaging surface to create an interference fit therewith, whereby the clamp interface member engaging surface and the clamp engaging surface create equal and opposite forces coplanar with a sliding tendency direction of the screen during rotation.

Yet another embodiment provides a centrifugal sugar refining device. The centrifugal sugar refining device comprises a rotatable drum defining an interior space, a rotatable support basket disposed at least partially in the interior space, a screen disposed in the basket for filtering sugar crystals from molasses during rotation of the drum, a clamp interface member rigidly disposed on the screen and defining a clamp engaging surface and a clamp to secure the screen with respect to the rotatable support basket. The clamp comprises a body and a screen retaining portion connected to the body. The screen retaining portion comprises a pressure-generating-centrifuge-screen engaging surface disposed against the screen and applying a force thereto to create a pressure fit; and a clamp interface member engaging surface disposed against the clamp engaging surface to create an interference fit therewith, whereby the clamp interface member engaging surface and the clamp engaging surface create equal and opposite forces coplanar with a sliding tendency direction of the screen during rotation.

In one embodiment, a clamp of the present invention secures a screen comprising a series of fine filter wires spaced closely together and mounted generally perpendicularly to a series of underlying support rods. In particular embodiments, the filter wires have a V-shaped profile with a width of approximately 0.020 inches. The mating points of the support rods also have a V-shaped profile with a width of approximately 0.060 inches. The filter wires are spaced approximately 0.0035 inches apart and the support rods are spaced approximately 0.38 inches apart. However, it will be understood by one of ordinary skill in the art that different dimensions may be used to create a fine opening, high open area centrifuge screen used, for example, to separate crystalline sugar from liquid raw molasses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The detailed description particularly refers to the accompanying figures in which.

DETAILED DESCRIPTION OF THE PREFERRED EMBODIMENT

Figure 1:
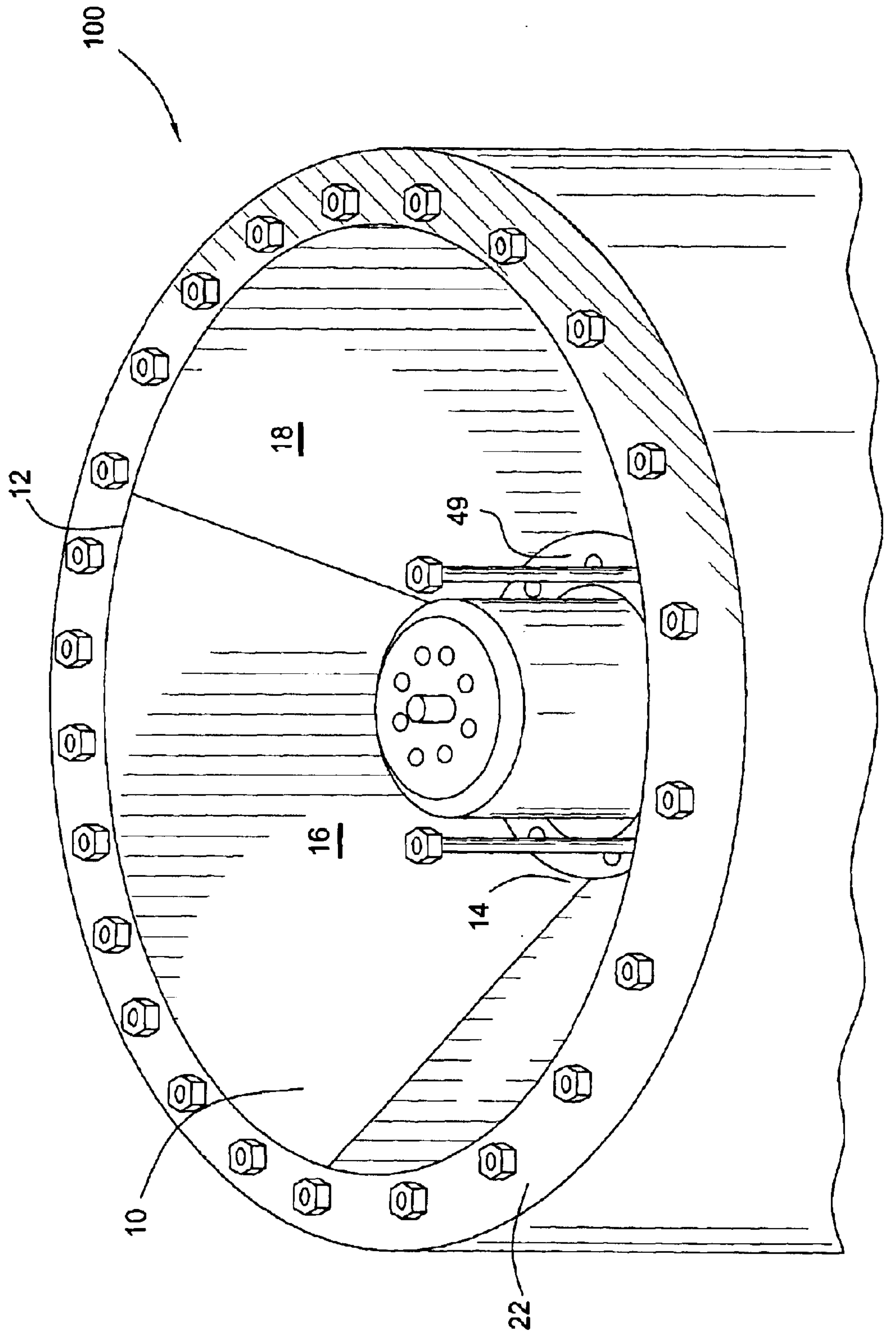
FIG. 1 is a perspective view of a centrifuge screen in accordance with the present invention within a sugar processing device having a centrifuge drum.

As shown in FIG. 1, a fine opening, high open area screen 10 in accordance with the present invention is shown in a sugar processing or refining device 100. The screen 10 is generally conical and has an upper rim 12, a lower rim 14, and a sidewall 16 extending from the upper rim 12 to the lower rim 14. The sidewall 16 has an inner surface 18 and an outer surface 20, best seen in FIG. 4. Referring back to FIG. 1, the conical shape of the screen 10 dictates that the sidewall 16 taper from the upper rim 12 to the lower rim 14, with the circumference of the upper rim 12 being approximately two and a half times the circumference of the lower rim 14.

The screen 10 is nested within a centrifuge drum 22 of the sugar processing device 100. The drum 22 includes a perforated, conical basket 26 (hidden from view in FIG. 1, shown in FIG. 8, as will be discussed below) underlying and supporting the conical screen 10. During sugar processing, liquid, raw molasses containing sugar crystals (not shown) are poured into the center of the centrifuge drum 22. The molasses are poured into the centrifuge drum 22 while it is spinning rapidly. In this way, the raw molasses are forced outward against the inner surface 18 of the sidewall 16 of the screen 10. The molasses are first forced against the sidewall 16 near the lower rim 14 of the screen 10. However, because the inner surface 18 is slanted from the lower rim 14 to the upper rim 12, the molasses "crawl" their way up the inner surface 18 as they are forced outward and through the screen 10. As the centrifuge drum 22 spins, the liquid raw molasses are forced through the screen 10, leaving sugar crystals behind. Because not all of the liquid, raw molasses can flow through the screen instantaneously, some of the molasses crawl up the inner surface 18 of the screen 10 before being forced through the screen 10. The greater the open area of the screen 10, the quicker the molasses flow through the screen 10 and the less they crawl up the inner surface 18. In any case, at some point between the lower rim 14 and the upper rim 12, the liquid raw molasses will have been filtered entirely through the screen 10, leaving only crystalline sugar on the inner surface 18 of the screen 10. The spinning of the centrifuge drum 22 causes the sugar crystals to continue to ride up the inner surface 18. While the liquid molasses can flow through the screen 10, the sugar crystals are too large to pass through. When the sugar crystals reach the upper rim 12, they are ejected out of the drum 22 and are collected around the perimeter of the drum 22.

Figure 5:
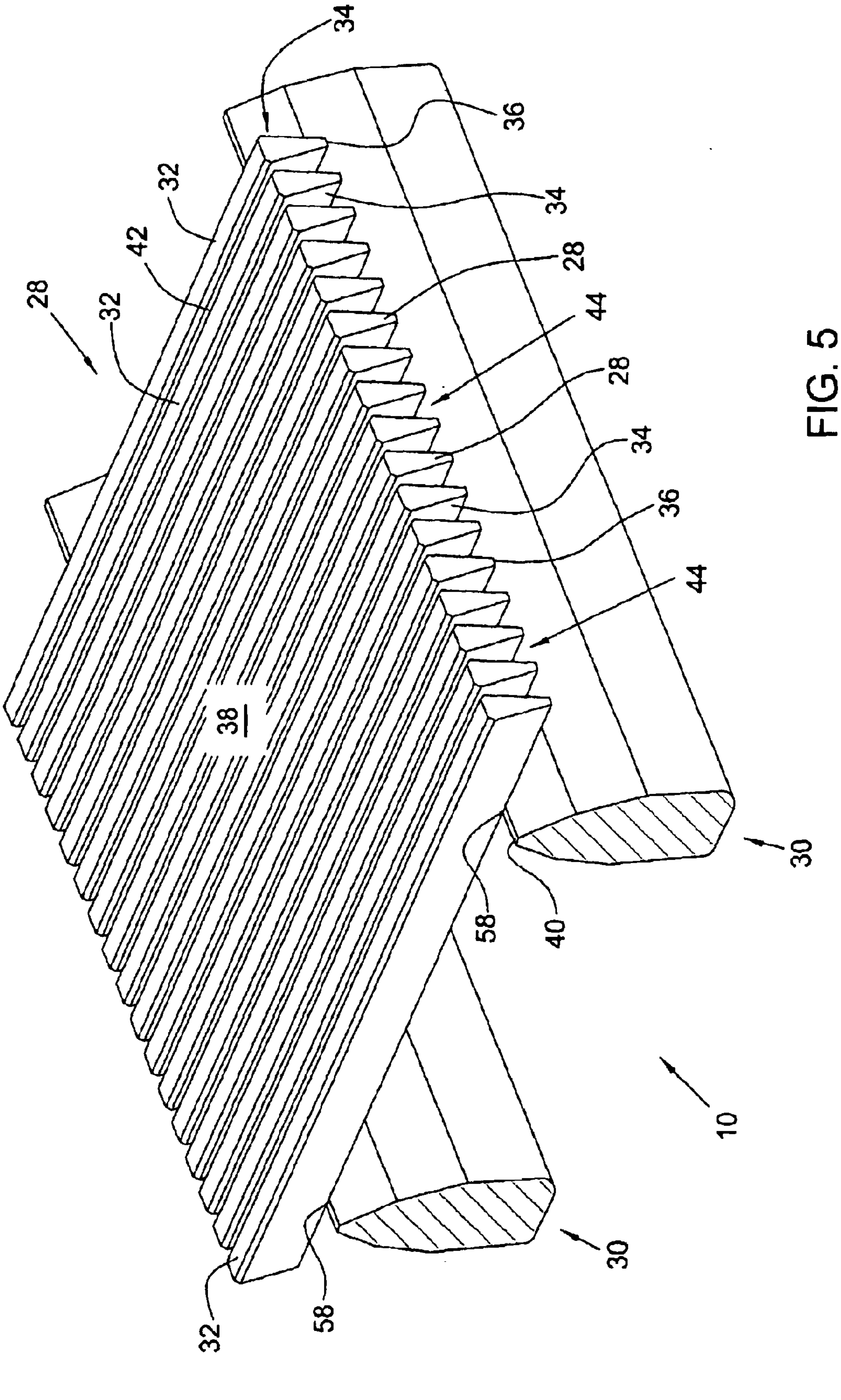
FIG. 5 is a perspective, detailed view of a section of the screen of FIG. 1, with portions broken away.

As mentioned above, the screen 10 allows a liquid, for example raw molasses, to pass though it, while filtering out fine particulate matter, for example crystalline sugar suspended in the molasses. As best seen in FIG. 5, the screen 10 is constructed of filter wires 28 in close, generally parallel relation to one another mounted on support rods 30. The filter wires 28 and support rods 30 are each a V-shaped profile wire, connoting that they each have a generally triangular-shaped cross-section. The filter wires 28 are mounted generally perpendicular to the support rods 30. Each filter wire 28 includes a face surface 32 and two side surfaces 34 which converge to a point 36. The filter wires 28 are aligned, side-by-side, with their face surfaces 32 lying in a plane 38, which, as will be further discussed below, creates the inner surface 18 of the screen 10.

The screen 10 is constructed by inserting a number of support rods 30 into a series of notches equally spaced around the circumference of a specially designed wheel (not shown). In the case of the V-shaped profile rods 30, the notches in the wheel would also be generally triangular in shape. In this way, the support rods are secured around the wheel and extend substantially perpendicularly to the wheel to create a cylinder of support rods 30. The wheel, and thus the cylinder of rods 30, is then rotated and a filter wire 28 is continuously and spirally wrapped around the rotating cylinder of rods 30. At each point where the filter wire 28 intersects a rod 30, an electrical charge is conducted through the intersection and the wheel, thereby welding the filter wire 28 to the rod 30. The result is a screen cylinder formed with longitudinally extending rods 30 spirally-wrapped in a filter wire 28. To create flat sheets of the screen material 10, the resulting cylinder is cut between two support rods 30, along the length of the cylinder. In this way, the spirally-wrapped filter wire 28 is cut at each revolution around the cylinder. The cylinder is then flattened, resulting in a sheet of screen 10, a portion of which is shown in FIG. 5.

Figure 4:
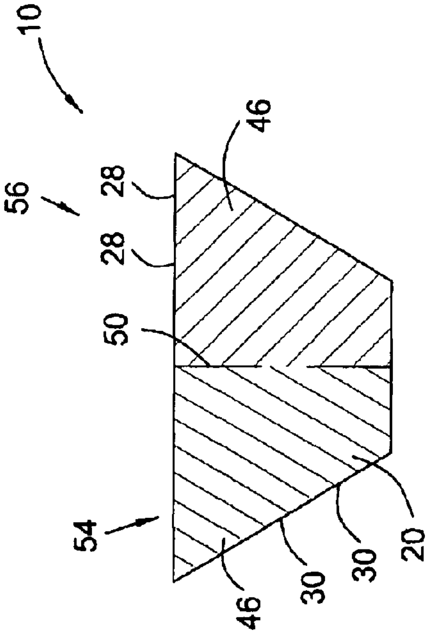
FIG. 4 is a side view of the screen of FIG. 1.

As shown in FIG. 5, in the resulting screen 10, the filter wires 28 are welded generally perpendicularly across the support rods 30 to create a filtering lattice material. In the illustrated embodiment, the face surfaces 32 of the filter wires 28 are 0.020 inches wide and are positioned 0.0035 inches apart from each other to create a filtering gap 42 between consecutive face surfaces 32. However, it will be readily understood by one of ordinary skill in the art that other dimensions may be employed which produce the desired sugar filtering results. The position of the filter wires 28 in relation to the support rods 30 in the complete screen 10 can be seen with reference to FIG. 4, wherein a left screen portion 54 includes the support rods 30 along with the filter wires 28, while a right screen portion 56 illustrates only the filter wires 28. As seen in FIG. 4, the support rods 30 are positioned generally perpendicular to the filter wires 28.

Referring again to FIG. 5, a filter channel 44 is created between opposing side surfaces 34 of consecutive filter wires 28. Because of the triangular shaped cross-section of the filter wires 28, the filter channels 44 between consecutive filter wires 28 open away from the plane 38 defined by the face surfaces 32 of the filter wires 28. Put another way, the filter channels 44 do not have parallel walls, but instead flare from the face surfaces 32 to the points 36 of the filter wires 28.

Figure 3:
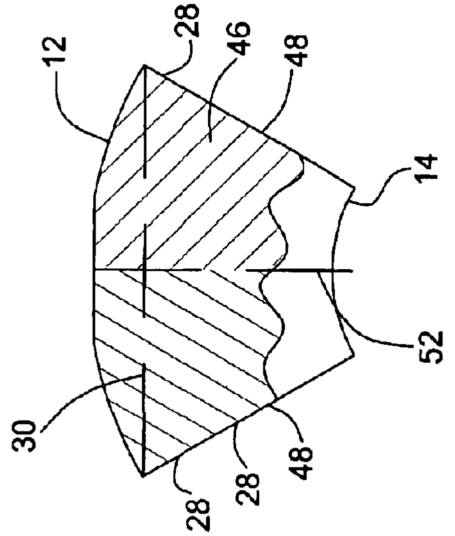
FIG. 3 is a plan view of one segment of the screen of FIG. 1.
Figure 2:
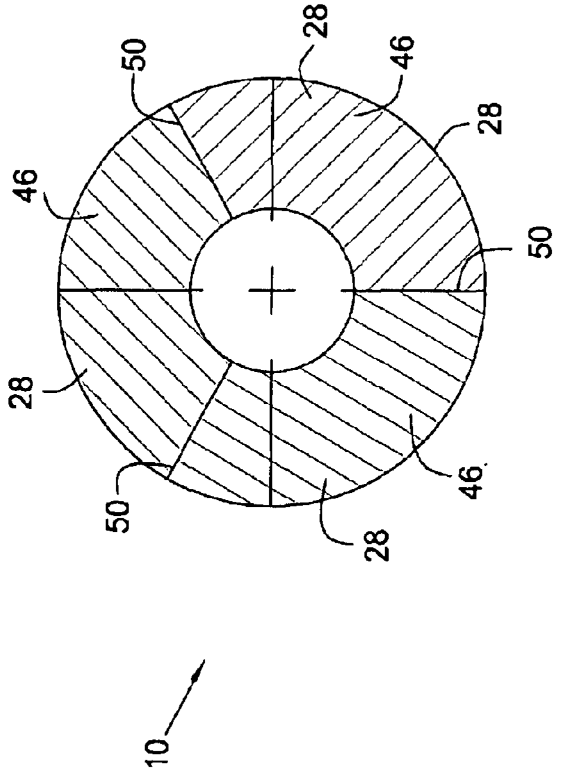
FIG. 2 is a top view of the screen of FIG. 1.

As shown in FIGS. 1–4, the screen 10 is constructed of three arcuate-shaped segments 46. The arcuate-shaped segments 46 are cut out of larger, flat sections of the filtering lattice material constructed as described above. As shown in FIG. 3, in this way, the filtering wires 28 run parallel to each other and toward the upper rim 12 of the segment 46 of screen 10. It will be readily apparent to one of ordinary skill in the art that, while the filter wires 28 extend generally radially in the screen 10, they do not extend truly radially from the lower rim 14 to the upper rim 12 of the screen 10. Truly radially aligned wires would diverge as they extended away from the lower rim 14 of the screen 10. In contrast, the filter wires 28 of the screen 10 of the present invention remain generally parallel, producing filtering gaps 42 of uniform width.

After being cut out of larger portions of the filtering lattice material, the arcuate-shaped screen segments 46 are rolled to match the curvature of the centrifuge basket. Then, the edges 48 of the three segments 46 are joined at screen joints 50 to form the truncated conical shape of the screen 10, as best seen in FIG. 4. The joints 50 are formed by welding the ends of the support rods 30 of one segment 46 to the ends of the support rods 30 of the adjacent segment 46. However, additional arrangements for coupling adjacent segments 46 may be used. For example, a rectangular bar joint (not shown) may be welded down the joint 50 between two consecutive segments 46. Alternatively, a T-bar (also not shown) may be used to hold down the edges 48 of consecutive segments 46. The vertical member of the T-bar may be coupled to the basket which holds the screen 10. The horizontal member of the T-bar would then hold down and guide the edges 48 of the segments 46 and protect the unsupported ends of the filter wires 28. The T-bar may act as a clamping mechanism to hold the screen 10 against the basket. An angle-shaped joint (not shown), oriented as an inverted "L," may also be used to form joints 50. Each screen segment 46 may have one edge 48 welded to the vertical segment of a piece of angle iron. In this way, the horizontal segment of the angle iron overlaps, holds, and protects the edge 48 of the adjacent screen segment 46.

Figure 6:
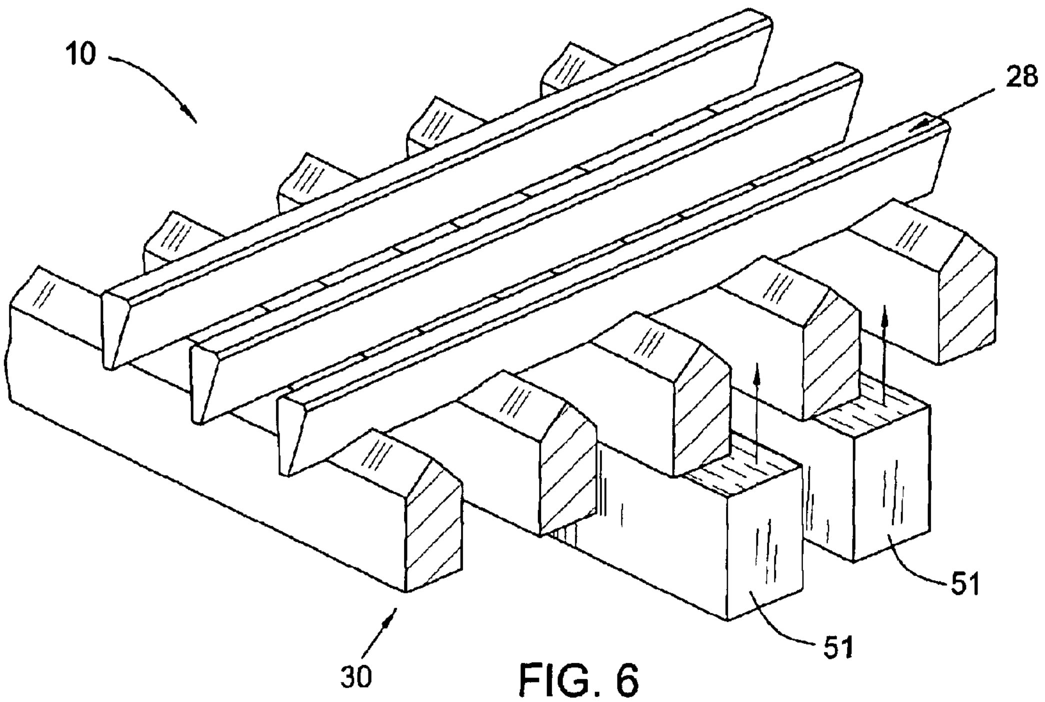
FIG. 6 is a perspective view of the section of screen of FIG. 5, including pieces of rubber being positioned between support rods of the section.
Figure 7:
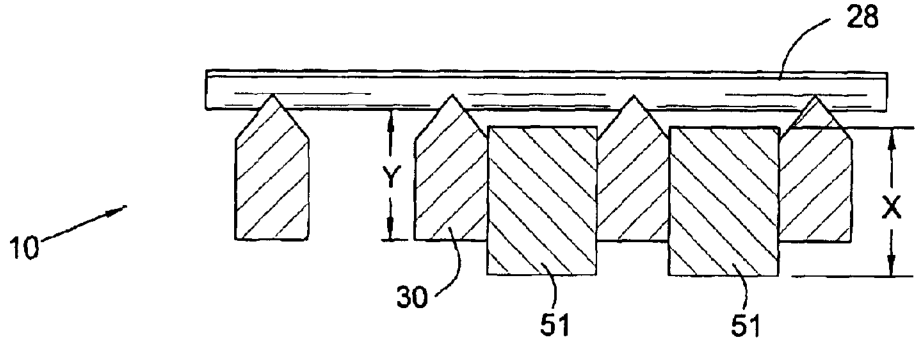
FIG. 7 is a side view of the pieces of rubber being positioned between the support rods of FIG. 6.
Figure 8:
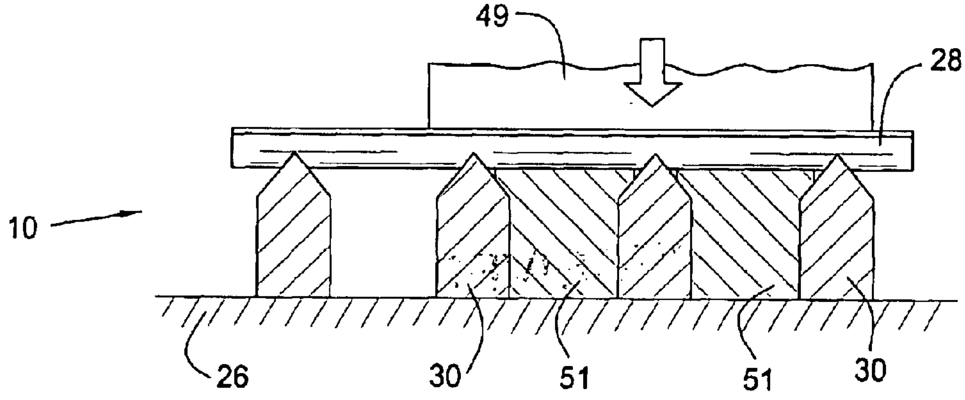
FIG. 8 is a side view of the pieces of rubber positioned between the support rods of FIG. 6.

Referring to FIG. 1, a collar (also referred to herein as a "clamping member", or simply "clamp") 49 is used to secure the screen 10 within the drum 22. The lower rim 14 of the screen 10 is clamped between the collar 49 and the conical basket 26, shown in FIG. 8. As shown in FIGS. 6–8, to increase friction between the screen 10 and the basket 26, pieces of rubber 51 may be applied between the support rods 30 in those locations directly beneath the collar 49. It will be readily understood by those of ordinary skill in the art that any material that is compressible and has a high coefficient of friction may be used instead of rubber. The pieces of rubber 51 may include adhesive on one or more sides to hold them in place. Referring to FIG. 7, the uncompressed thickness X of the rubber 51 is slightly greater than the exposed height Y of the support rods 30 to ensure that the rubber 51 is in compression when the collar 49 clamps the screen 10 to the basket 26 (FIG. 8). Embodiments of the collar 49 will be described below.

With the screen 10 formed and shaped as discussed above, at a center 52 of each screen segment 46, the filter wires 28 are generally aligned with the flow of product as it crawls up the inner surface 18 created by the face surfaces 32 of the filter wires 28, and the support rods 30 run generally transverse to the flow. At the joints 50 between the segments 46, the filter wires 28 are less aligned with the flow path of the product because of the way in which the screen segments 46 are cut out of flat sections of the lattice material and roll formed, as described above (See FIG. 4). As liquid product is forced against the screen 10 in the spinning centrifuge drum 22, the liquid, raw molasses flow past filtering gaps 42 and through filtering channels 44. From there, the liquid, raw molasses flow through an annular space created by the support rods 30 between the filter wires 28 and the perforated basket 26 that holds the screen 10. The liquid molasses then continue through the perforations in the perforated basket and out of the sugar refining device 100.

The sugar crystals work their way up the inner surface 18 created by the face surfaces 32 of the filter wires 28. Because of their size, the sugar crystals cannot pass through the filtering gaps 42 between the filter wires 28. Instead, the sugar crystals pass up the inner surface 18 of the screen 10 and are ejected over the upper rim 12 of the screen 10, where they are collected.

As will be readily apparent to those of ordinary skill In the art, the present invention as described above and illustrated in FIGS. 1–8 may be used in a number of applications in which a fine opening, high open area centrifuge screen is used to separate a solid from a liquid, such as, but not limited to, sugar processing, coal dewatering, driller mud dewatering, etc.

Figure 9A:
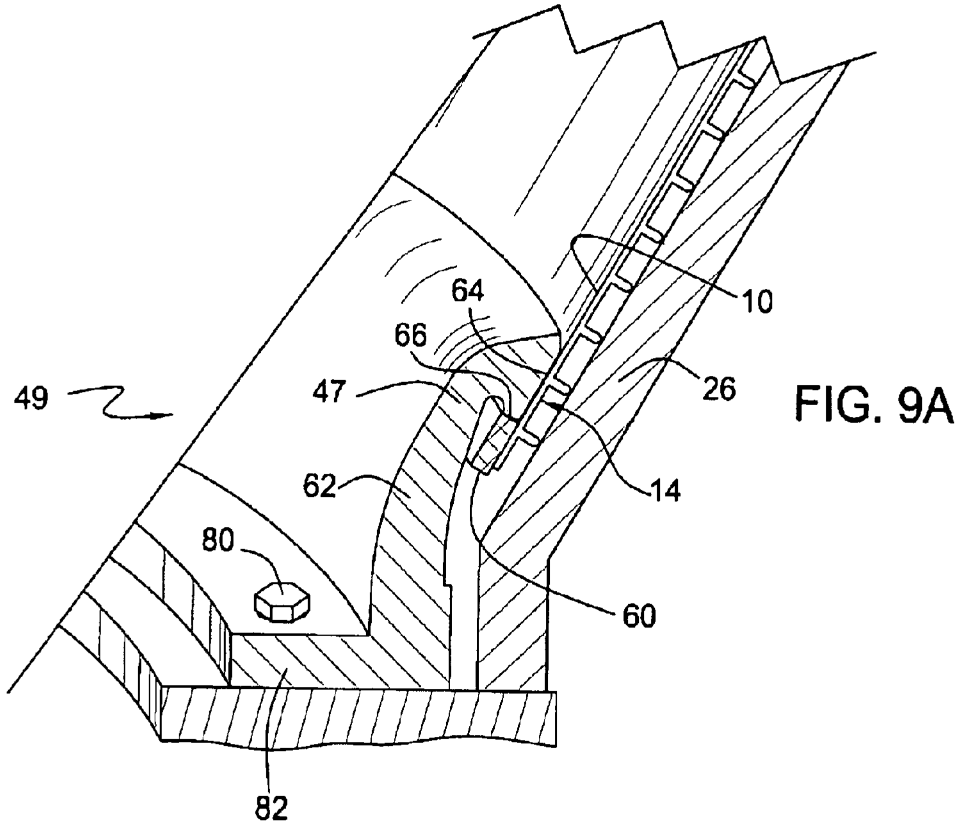
FIGS. 9A-B are partial cross sectional views of a centrifuge with a clamp according to one embodiment of the invention.
Figure 9B:
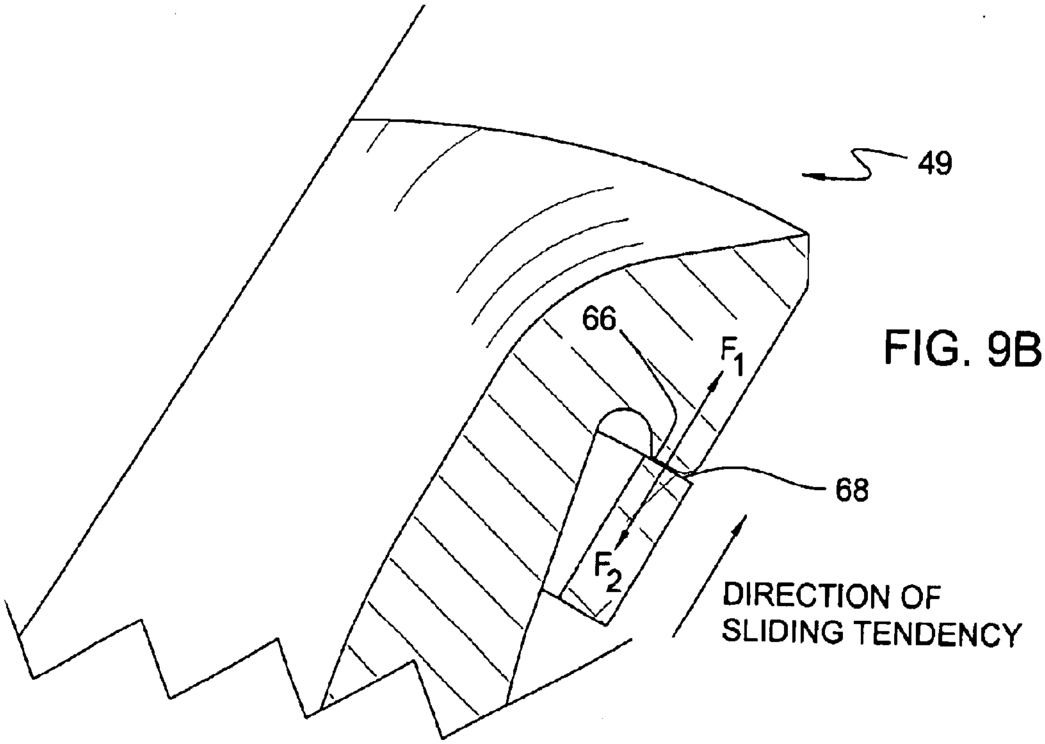

FIGS. 9A-B (collectively referred to as FIG. 9) are partial cross-sectional perspective views of the refining device 100 of FIG. 1 illustrating one embodiment in accordance with the present invention. Accordingly, FIG. 9A generally shows the conical basket 26, the screen 10, a clamping member 49 and a clamp interface member 60. In part, the screen 10 may be held in place by the friction created between the basket 26 and the clamping member 49. To this end, a friction member may be disposed between the screen 10 and the comical basket 26, such as the rubber 51 described above. The screen 10 is further secured by the cooperation of the clamping member 49 and the clamp interface member 60. Embodiments of the clamping member 49 and the clamp interface member 60 will now be described in detail.

In the embodiment of FIG. 9, the clamp interface member 60 is a generally annular member connected to the lower rim 14 of the screen 10 and adapted to engage with a portion of the clamping member 49. In one embodiment, the clamp interface member 60 is welded to an inner portion of the lower rim 14. However, other connection means may be employed, so long as, the connection means is able to secure the clamp interface member 60 on the lower rim 14. In another embodiment, the clamp interface member 60 may be an integral portion of the screen 10 itself. For example, a portion of the lower rim 14 may be bent upward to form the clamp interface member 60.

In the embodiment of FIG. 9, the clamping member 49 is an annular member generally comprising a body 62 and a screen restraining portion 47. A lower end of the body 62 may be secured to the refining device 100 according to any variety of techniques, including those well-known in the art. By way of example, the clamping member 49 is secured to the refining device 100 by fasteners 80 (e.g., bolts) disposed through a flange 82 of the clamping member 49. Illustratively, the screen restraining portion 47 is a hook-shaped member defining a screen engaging surface 64 and a clamp interface member engaging surface 66. The screen engaging surface 64 is shown in mating abutment with the lower rim 14 of the screen 10, whereby a downward pressure is exerted by the screen engaging surface 64 on the lower rim 14. In this manner, the inertia of the spinning screen 10 in operation produces a counteracting friction force to resist any sliding (slippage) of the screen 10. However, because the direction of the slippage is generally parallel to the planar screen engaging surface 64, once the frictional force is overcome, the screen 10 may slide out from between the clamping member 49 and the basket 26 without the provision of further restrictions. In the present invention, any sliding tendency of the screen 10 is further inhibited by the clamp interface member engaging surface 66, which creates an interference fit with the clamp interface member 60. In particular, the clamp interface member engaging surface 66 is shown in mating abutment with an upper clamp engaging surface 68 of the clamp interface member 60, as best shown in FIG. 9B. The resulting equal and opposite forces produced by the surfaces 66, 68 are shown as F1 and F2, respectively. In the illustrative embodiment, the forces are substantially normal to the planar surfaces 66, 68. However, the embodiment of FIG. 9 is merely illustrative and other embodiments are contemplated in which opposing forces between the clamping member 49 and the clamping interface member 60 are generated in response to any sliding tendency of the screen 10.

Figure 10:
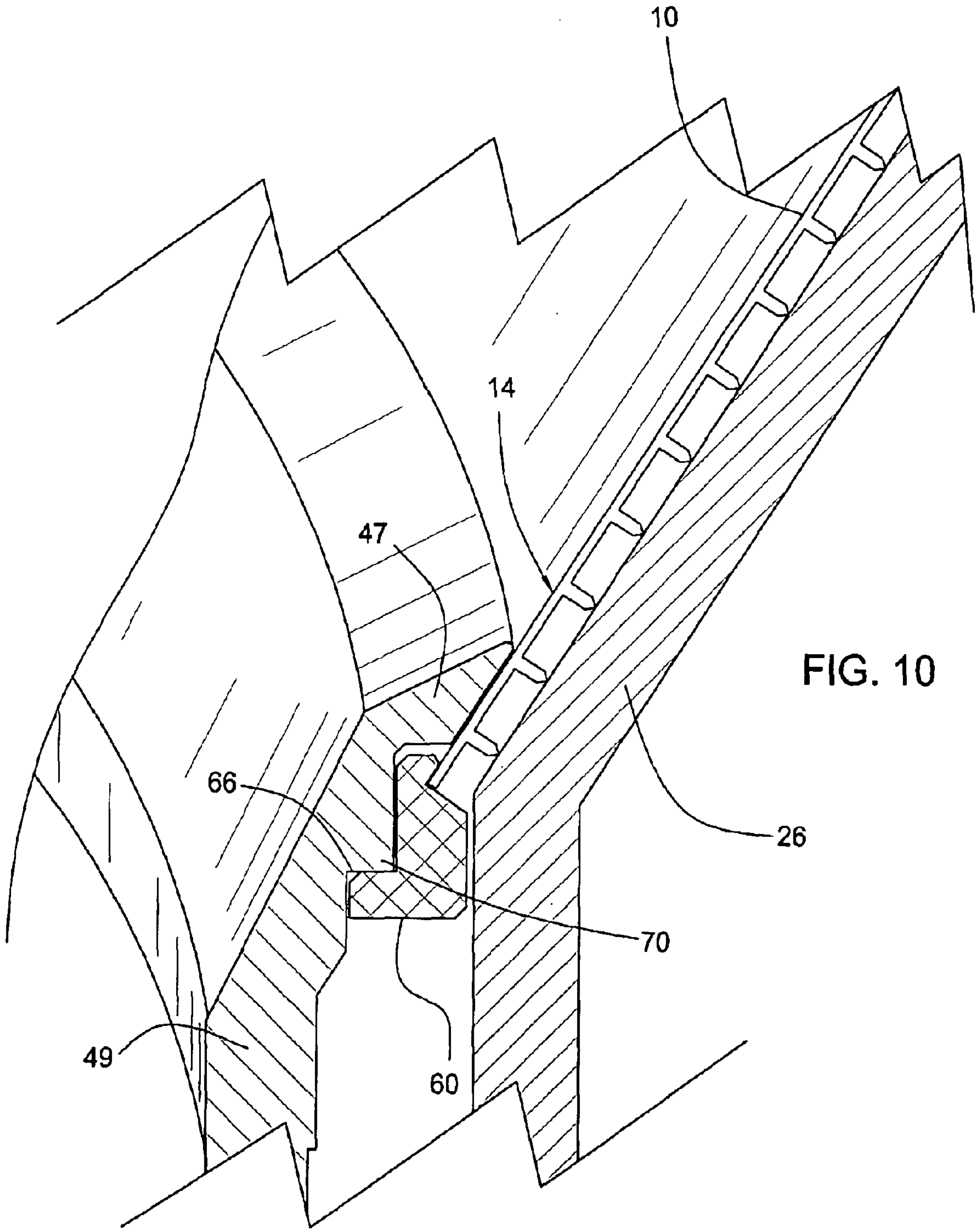
FIG. 10 is a partial cross sectional view of a centrifuge with a clamp according to another embodiment of the invention.
Figure 11:
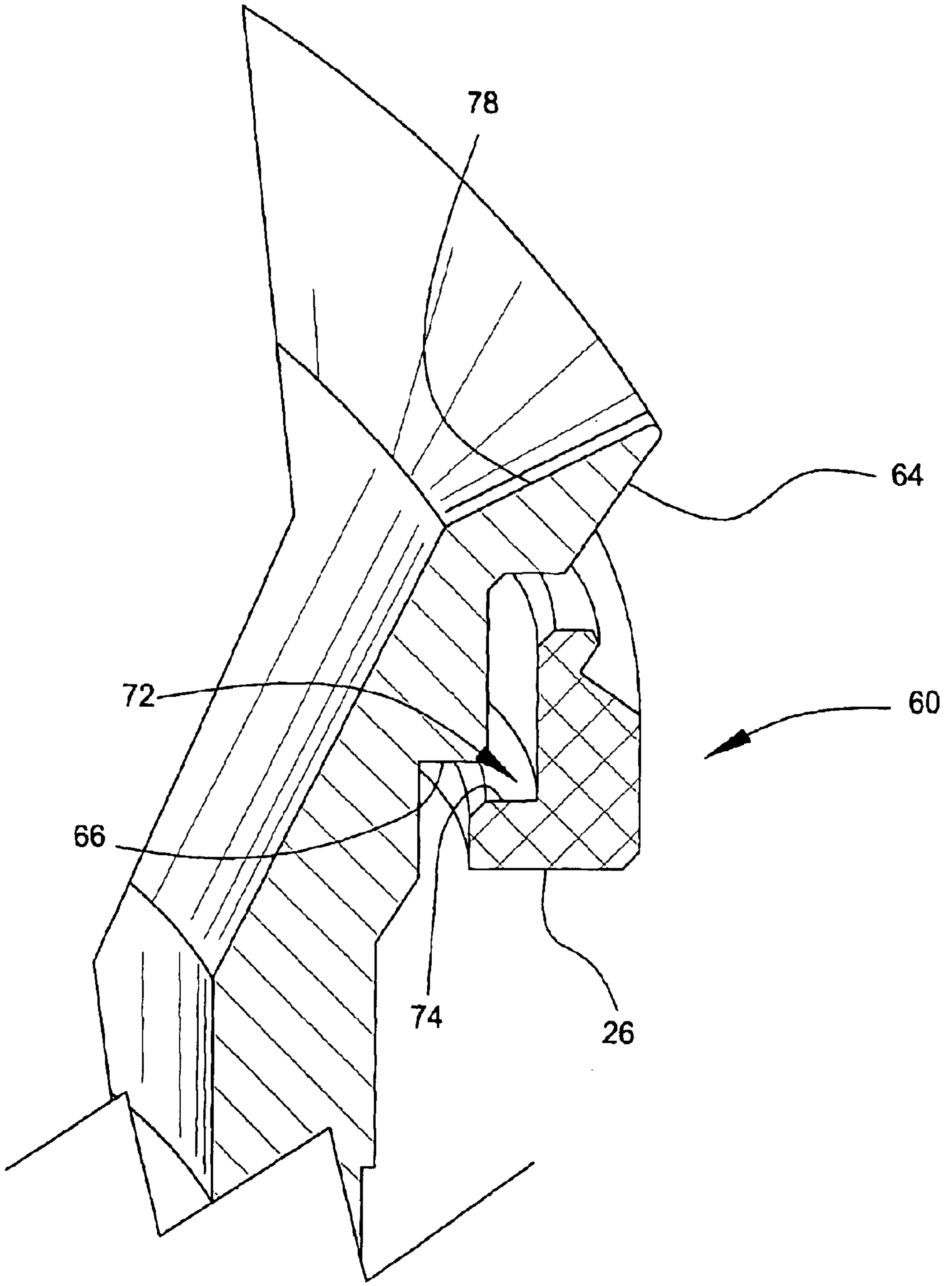
FIG. 11 is a partial cross sectional exploded view of clamp and interface member of FIG. 10.
Figure 12:
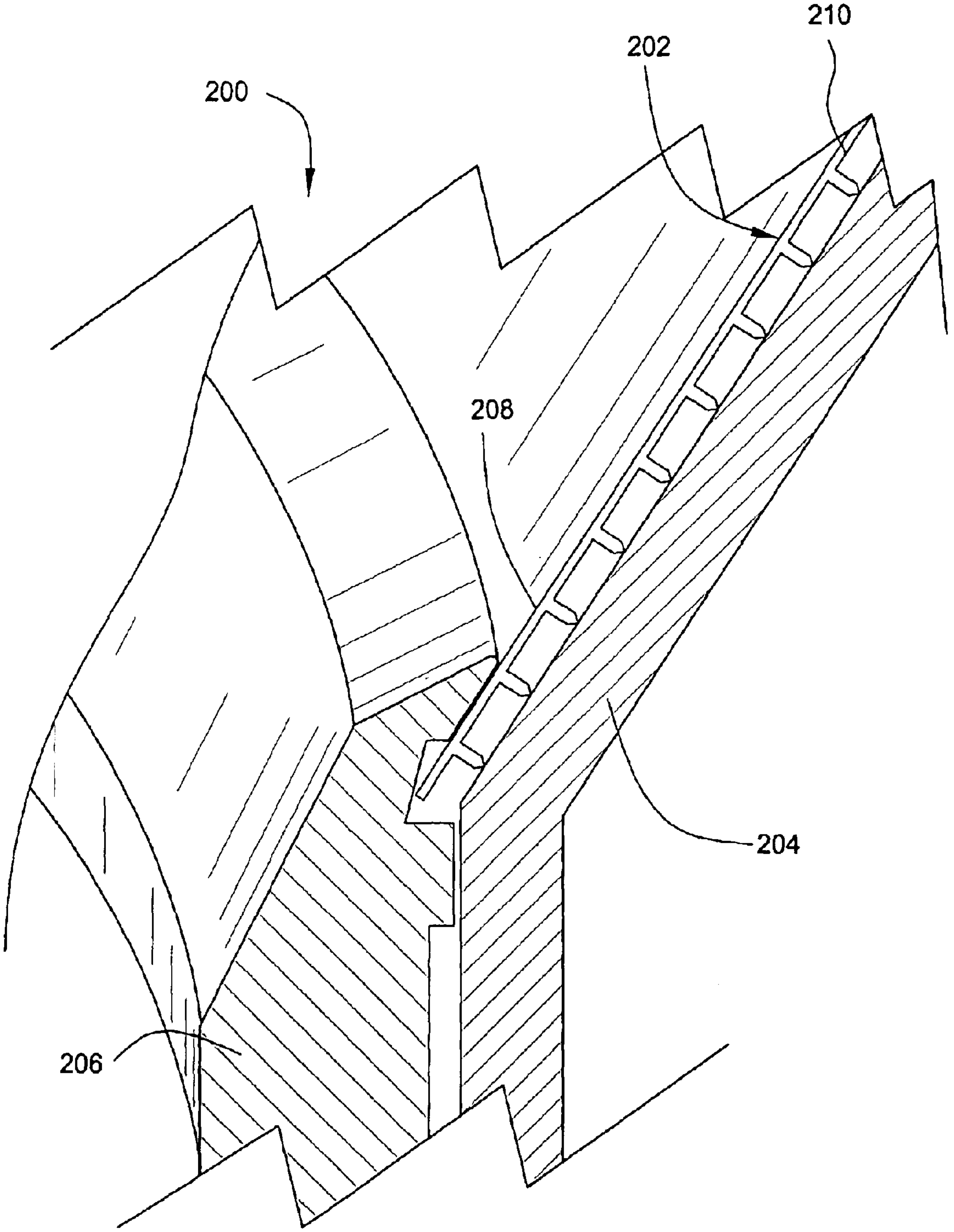
FIG. 12 (PRIOR ART)
FIG. 12 is a partial cross sectional view of a centrifuge with a clamp according to the prior art.

For example, illustrative alternative embodiments of the clamping member 49 and the clamping interface member 60 are shown in FIGS. 10 and 11. FIG. 10 shows a partial cross-sectional perspective view of the refining device 100 and FIG. 11 shows a partial exploded cross-sectional view of the refining device 100. For convenience, like numerals identify the same or substantially similar components described above. In this embodiment, the clamping member 49, and in particular the screen retaining portion 47, has a stepped profile. The stepped profile is defined by an annular shoulder 70 which defines the clamp interface member engaging surface 66. The annular shoulder 70 is sized to be received in a notch 72 formed in the interface member 60. The notch 72 is, in part, defined by a ledge 74 on which the surface 66 rests. In operation, the ledge 74 is urged against the surface 66 of the shoulder 70 as a result of the inertia of the screen 10. Because the shoulder surface 66 is oriented to prevent the clamp interface member 60 from sliding over the ledge 74, the shoulder 70 and the clamp interface member 60 achieve a cooperative hooking action to prevent movement of the screen 10.

In addition to the hooking action achieved by the shoulder 70 of the clamping member 49 and the clamp Interface member 60, the clamping member 49 creates a frictional force by applying a pressure downward on the screen 10. The pressure is applied, at least in part, by a lip portion 78 of the screen restraining portion clamping member 49. The lip portion 78 extends from the body of the clamping member 49 and is positioned over the screen 10. The clamp interface member surface 64 formed on the lip portion 78 is placed in mating abutment with the lower rim 14 of the screen 10 ( shown in FIG. 10). When the clamping member 49 is secured to the refining device 100 (e.g., in a conventional manner), a pressure is exerted by the lip on the screen 10, thereby “sandwiching” the screen 10 between the clamping member 49 and the basket 26 (as shown in FIG. 10).

It should be understood that while various surfaces disclosed herein are described as being in mating abutment, direct physical contact between the surfaces (e.g., surfaces 66 and 74) Is not necessary. For example, intermediary materials or films may be disposed between the surfaces for various purposes (e.g., to minimize wear of parts). Alternatively, such intermediary materials may themselves be understood as defining the various surfaces disclosed herein, in which case direct physical contact between the surfaces exists.

In the foregoing embodiments, the clamping member 49 and the clamp interface member 60 are described in shown as annular members. However, persons skilled in the art will recognize that a variety of geometries and configurations are possible. For example, either or both the clamping member 49 and the clamp interface member 60 need not be singular monolithic components. Instead it is contemplated that individual discrete members may collectively make up the clamping member 49 and/or the clamp interface member 60. For example, the screen restraining portion 47 of the clamping member may comprise a plurality of fingers each engaging the clamp interface member 60. Such embodiments may be desirable, for example, where it is advantageous to minimize weight.

To ensure sufficient strength, the clamping member 49 and the clamp interface member 60 may be made of metal. For example, in one embodiment the clamping member 49 may be made of stainless steel 303 or 304 and the clamp interface member 60 may be made of stainless steel 316L. However, the foregoing materials are merely illustrative and persons skilled in the art may recognize other suitable materials.

While the foregoing is directed to embodiments of the present invention, other and further embodiments of the invention may be devised without departing from the basic scope thereof, and the scope thereof is determined by the claims that follow.

What is claimed is:

1. A centrifuge screen clamp, comprising:

a body adapted to be secured to a centrifuge; and a screen retaining portion connected to the body, comprising:

a pressure-generating-centrifuge-screen engaging surface adapted to engage a centrifuge screen and apply a force thereto to create a pressure fit; and an interface member engaging surface adapted to engage a corresponding interface portion disposed on the centrifuge screen and create an interference fit therewith, whereby the interface member engaging surface and a clamp engaging surface create equal and opposite forces coplanar with a sliding tendency direction of the screen during rotation.

2. The centrifuge screen clamp of claim 1, screen retaining portion comprises a shoulder and wherein the interface member engaging surface is formed on the shoulder.

3. The centrifuge screen clamp of claim 1, wherein the screen retaining portion is hook-shaped.

4. The centrifuge screen clamp of claim 1, wherein the screen retaining portion is annular.

5. A centrifugal refining device, comprising:

a rotatable support basket;

a screen disposed in the basket for filtering a liquid during rotation of the drum;

a clamp interface member rigidly disposed on the screen and defining a clamp engaging surface; and a clamp to secure the screen with respect to the rotatable support basket, the clamp comprising:

a body; and a screen retaining portion connected to the body, comprising:

(a) a pressure-generating-centrifuge-screen engaging surface disposed against the screen and applying a force thereto to create a pressure fit; and (b) a clamp interface member engaging surface disposed against the clamp engaging surface to create an interference fit therewith, whereby the clamp interface member engaging surface and the clamp engaging surface create equal and opposite forces coplanar with a sliding tendency direction of the screen during rotation.

6. The device of claim 5, wherein the basket is conical-shaped.

7. The device of claim 5, wherein the pressure-generating-centrifuge-screen engaging surface and the clamp interface member engaging surface are oriented at an angle with respect to one another.

8. The device of claim 5, wherein the screen comprises a plurality of spaced-apart, parallel support rods, supporting a plurality of spaced-apart parallel filter wires, the spaced-apart filter wires defining filtering gaps between the spaced-apart filter wires, the filtering gaps being less than 0.010 inches wide.

9. The device of claim 5, wherein the screen comprises a plurality of wires arranged in mutually parallel relation, the wires having a cross-sectional width of less than 0.030 inches and spaced apart by a dimension which is less than the cross-sectional width of the wires.

10. The device of claim 5, wherein the liquid comprises molasses and sugar crystals.

11. The device of claim 5, wherein the wherein the screen retaining portion is hook-shaped.

12. The device of claim 5, wherein the wherein the screen retaining portion is annular.

13. The device of claim 5, wherein the screen retaining portion comprises a shoulder and wherein the clamp interface member engaging surface is formed on the shoulder.

14. The device of claim 13, wherein the clamp interface member is annular and defines a ledge on which the shoulder is disposed.

15. The device of claim 13, wherein the screen retaining portion comprises a distal lip portion and wherein the pressure-generating-centrifuge-screen engaging surface is formed on the lip portion.

16. A centrifugal sugar refining device, comprising:

a rotatable drum defining an interior space;

a rotatable support basket disposed at least partially in the interior space;

a screen disposed in the basket for filtering sugar crystals from molasses during rotation of the drum;

a clamp interface member rigidly disposed on the screen and defining a clamp engaging surface; and a clamp to secure the screen with respect to the rotatable support basket, the clamp comprising:

a body; and a screen retaining portion connected to the body, comprising:

(a) a pressure-generating-centrifuge-screen engaging surface disposed against the screen and applying a force thereto to create a pressure fit; and (b) a clamp interface member engaging surface disposed against the clamp engaging surface to create an interference fit therewith, whereby the clamp interface member engaging surface and the clamp engaging surface create equal and opposite forces coplanar with a sliding tendency direction of the screen during rotation.

17. The device of claim 16, wherein the drum and the basket are conical-shaped.

18. The device of claim 16, wherein the screen retaining portion is hook-shaped.

19. The device of claim 16, wherein the screen retaining portion is annular.

20. The device of claim 16, wherein the screen comprises a plurality of screen pieces secured to one another.

21. The device of claim 16, wherein the screen comprises a plurality of wires arranged in mutually parallel relation, the wires having a cross-sectional width of less than 0.030 inches and spaced apart by a dimension which is less than the cross-sectional width of the wires.

22. The device of claim 16, wherein the screen comprises a plurality of spaced-apart, parallel support rods, supporting a plurality of spaced-apart parallel filter wires, the spaced-apart filter wires defining filtering gaps between the spaced-apart filter wires, the filtering gaps being less than 0.010 inches wide.

23. The device of claim 22, wherein at least one filter wire has a triangular-shaped cross-section.

24. The device of claim 16, wherein the screen retaining portion comprises a shoulder and wherein the clamp interface member engaging surface is formed on the shoulder.

25. The device of claim 24, wherein the clamp interface member is annular and defines a ledge on which the shoulder is disposed.

26. A method for securing a screen within a centrifugal refining device, comprising:

providing a basket disposed within a rotatable drum;

disposing a rim portion of a conical screen against the basket, the rim portion having a clamp interface member disposed thereon;

securing the conical screen with respect to the basket with a clamp, wherein securing comprises:

pressure fitting the conical screen between the clamp in the basket;

engaging a clamp surface with a clamp interface member surface formed on the clamp interface member to create an interference fit therewith, whereby the clamp surface are urged against one another during rotation of the screen as a result of an inertial sliding tendency of the screen during rotation.

27. The method of claim 26, further comprising rotating the drum to cause rotation of the basket, the screen and the clamp.

28. The method of claim 26, wherein pressure fitting the conical screen comprises disposing the screen between respective coplanar surfaces of the clamp and the basket.

29. A centrifuge screen clamp, comprising:

a body operatively connectable to a centrifuge; and a screen retaining portion connected to the body, wherein the screen retaining portion engages a clamp interface member disposed on a substantially conical screen to retain the substantially conical screen in the centrifuge.

30. The centrifuge screen clamp of claim 29, wherein the screen retaining portion includes a screen engaging surface and an interface member engaging surface.

31. The centrifuge screen clamp of claim 30, wherein the interface member engaging surface is adapted to engage a corresponding clamp engaging surface on the claim interface member to create an interference fit therewith, whereby the interface member engaging surface and the clamp engaging surface create equal and opposite forces coplanar with the sliding tendency direction of the screen during rotation.

32. The centrifuge screen clamp of claim 29, screen retaining portion comprises a shoulder and wherein the interface member engaging surface is formed on the shoulder.

33. The centrifuge screen clamp of claim 29, wherein the screen retaining portion is hook-shaped.

34. The centrifuge screen clamp of claim 29, wherein the screen retaining portion is annular.

35. A clamp system for use with a centrifuge type substantially conical screen, the system comprising:

a clamp connectable at a first location to a centrifuge and at a second location to the substantially conical screen; and a clamp interface member disposed on the substantially conical screen whereby, the clamp, when in use holds the substantially conical screen directly against a backing portion of the centrifuge and operates with the interface member to prevent movement of the substantially conical screen due to rotational forces brought about by operation of the centrifuge.

* * * * *